No. 674,177. Patented May 14, 1901.
J. W. VON PITTLER.
LATHE WITH ROTARY TOOL HEAD.
(Application filed July 16, 1896.)
(No Model.) 5 Sheets—Sheet 1.

WITNESSES:

INVENTOR
Julius W. von Pittler
BY
ATTORNEYS.

No. 674,177. Patented May 14, 1901.
J. W. VON PITTLER.
LATHE WITH ROTARY TOOL HEAD.
(Application filed July 16, 1896.)

(No Model.) 5 Sheets—Sheet 2.

No. 674,177. Patented May 14, 1901.
J. W. VON PITTLER.
LATHE WITH ROTARY TOOL HEAD.
(Application filed July 16, 1896.)
(No Model.) 5 Sheets—Sheet 4.
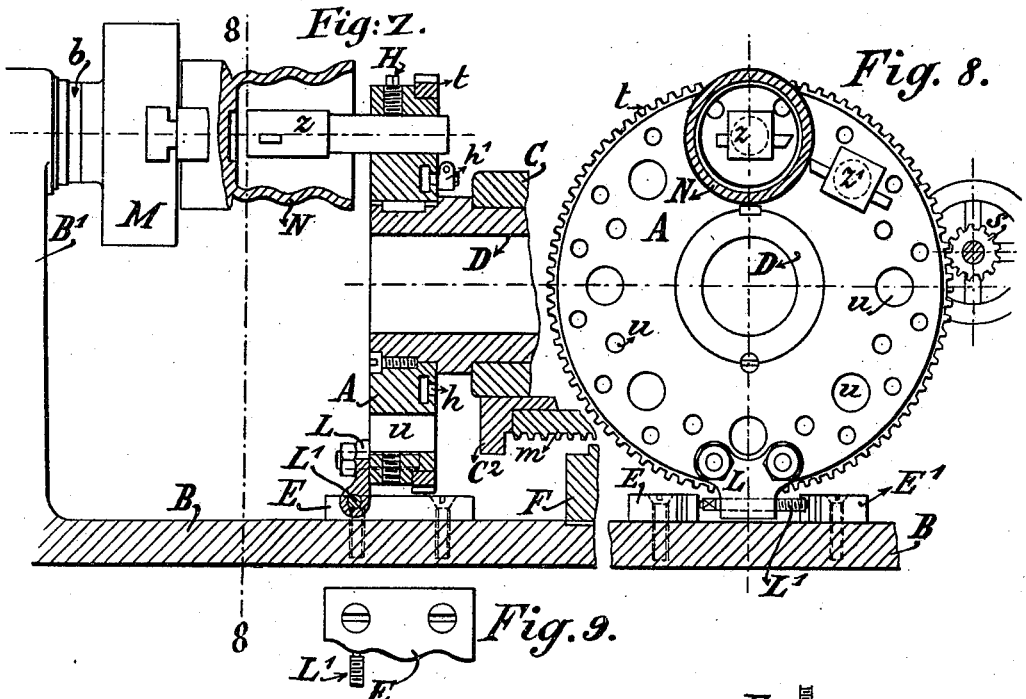
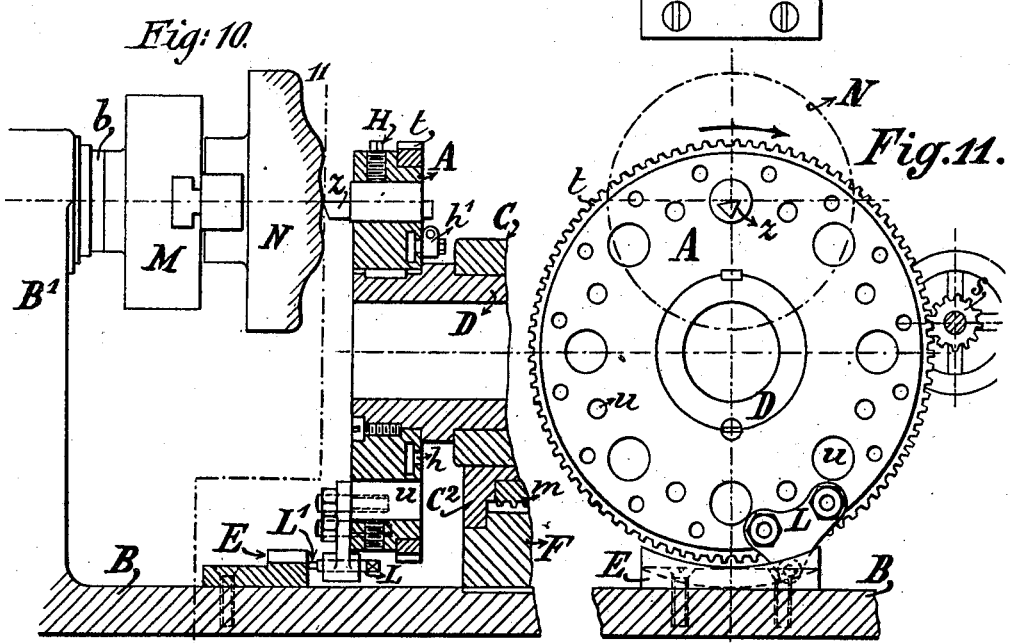

No. 674,177. Patented May 14, 1901.
J. W. VON PITTLER.
LATHE WITH ROTARY TOOL HEAD.
(Application filed July 16, 1896.)
(No Model.) 5 Sheets—Sheet 5.
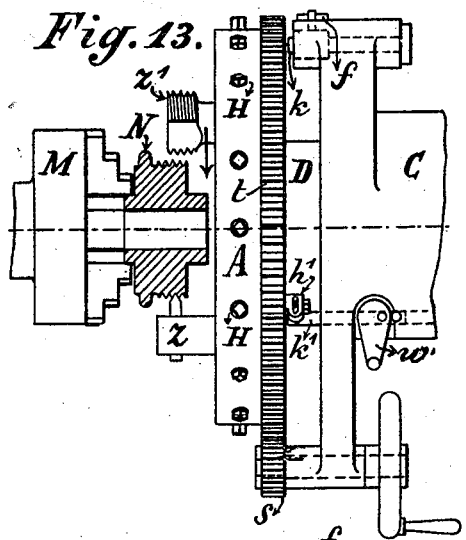
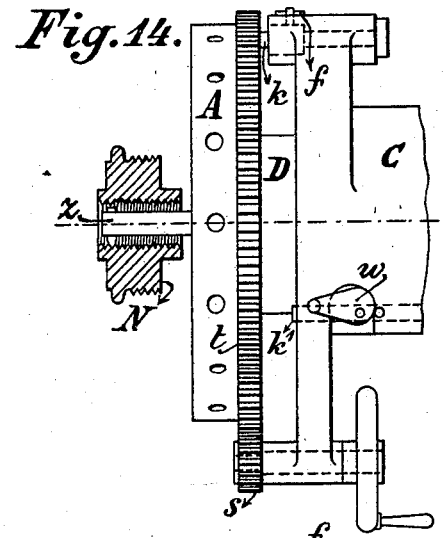
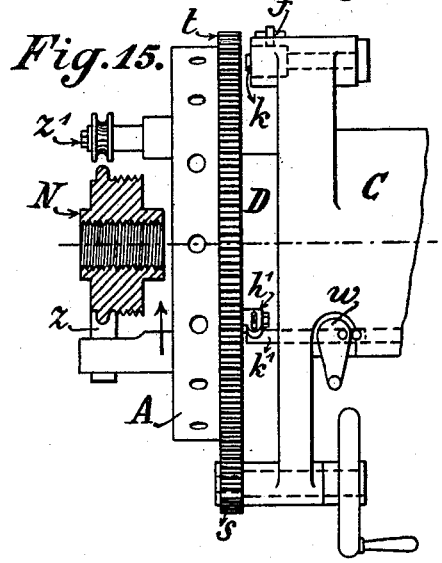
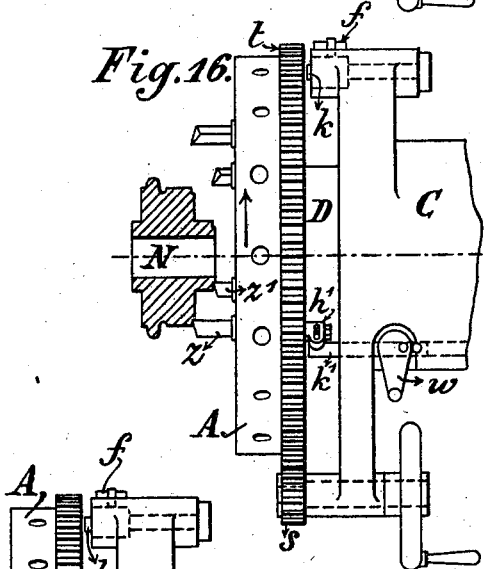
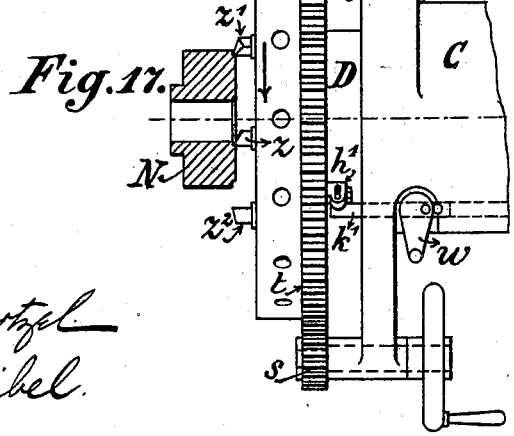
WITNESSES:
INVENTOR
ATTORNEYS.

UNITED STATES PATENT OFFICE.

JULIUS WILHELM VON PITTLER, OF LEIPSIC-GOHLIS, GERMANY, ASSIGNOR TO LEIPZIGER WERKZEUG MASCHINENFABRIK, VORMALS W. VON PITTLER, AKTIEN GESELLSCHAFT, OF LEIPSIC-WAHREN, GERMANY.

LATHE WITH ROTARY TOOL-HEAD.

SPECIFICATION forming part of Letters Patent No. 674,177, dated May 14, 1901.

Application filed July 16, 1896. Serial No. 599,451. (No model.)

*To all whom it may concern:*

Be it known that I, JULIUS WILHELM VON PITTLER, a subject of the King of Prussia, German Emperor, residing at Leipsic-Gohlis, Germany, have invented new and useful Improvements in Lathes with Rotary Tool-Heads, of which the following is a clear and exact specification.

This invention relates to an improved lathe with rotary tool-heads or turrets, which has the characteristic that the carriage carrying the tool-head can be moved only longitudinally of the machine but not transversely thereto and that plane-turning can only be accomplished by the turning of the tool-head by hand or by means of an automatic motion-transmitting gear.

The invention consists of certain features of construction and combinations of parts to be hereinafter fully described and then particularly claimed.

In the accompanying drawings is shown an improved lathe of this type, in which—

Figure 1:
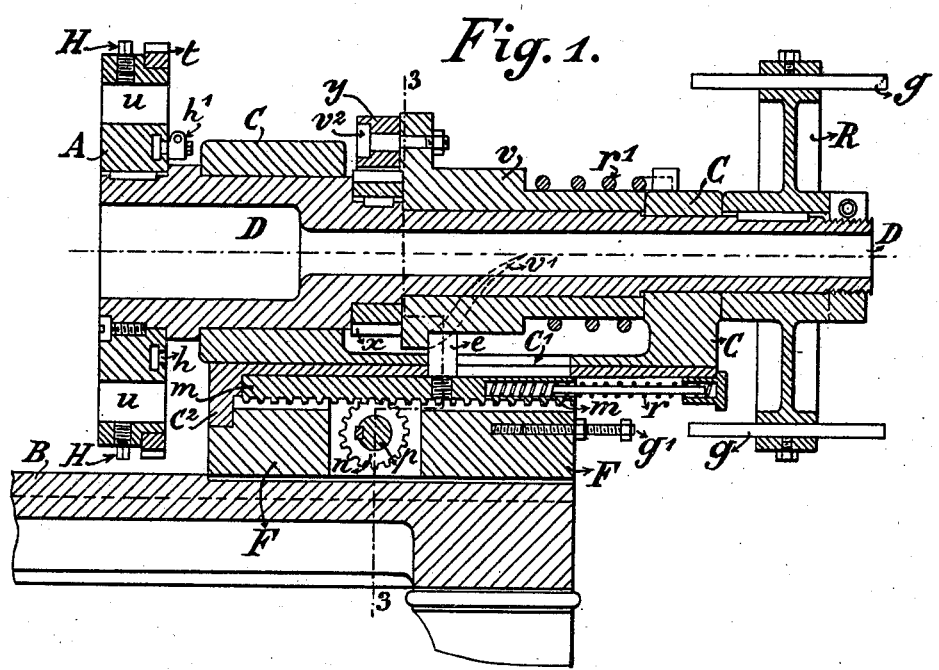
Figure 2:
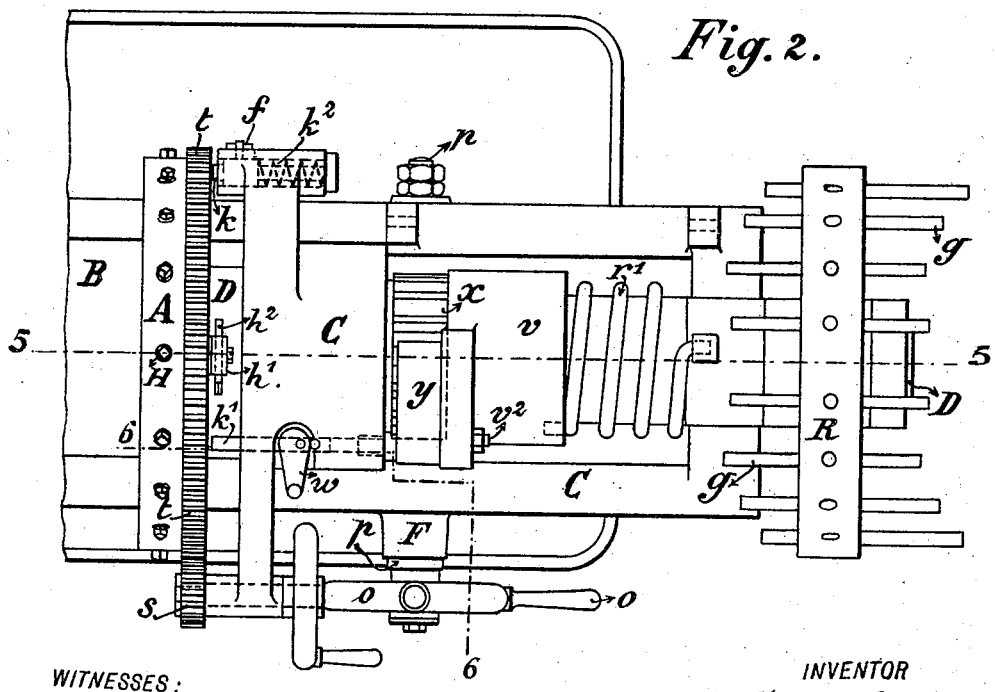
Figure 3:
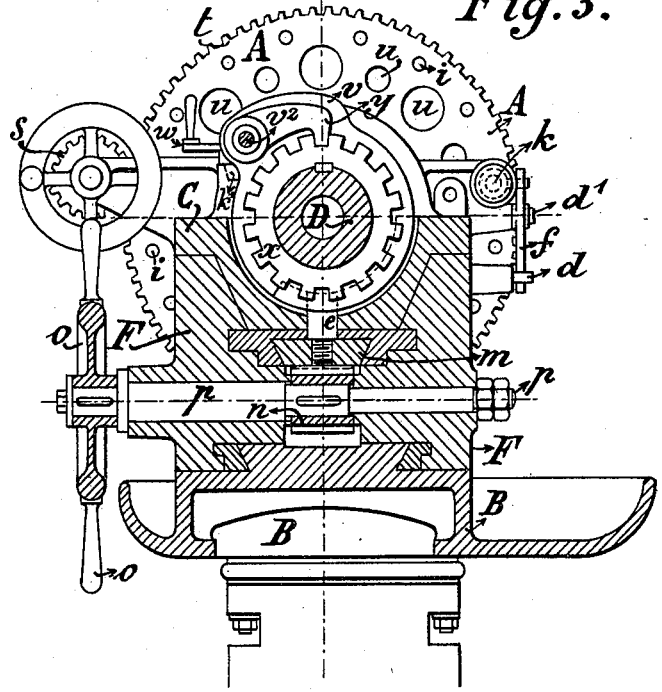
Figure 4:
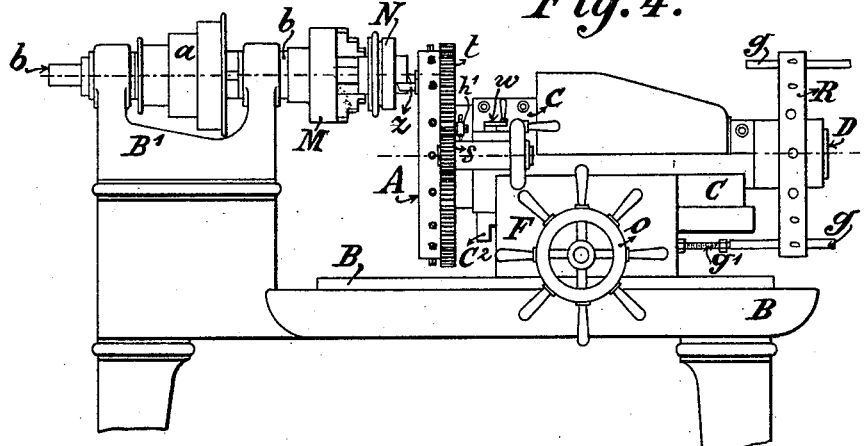
Figure 5:
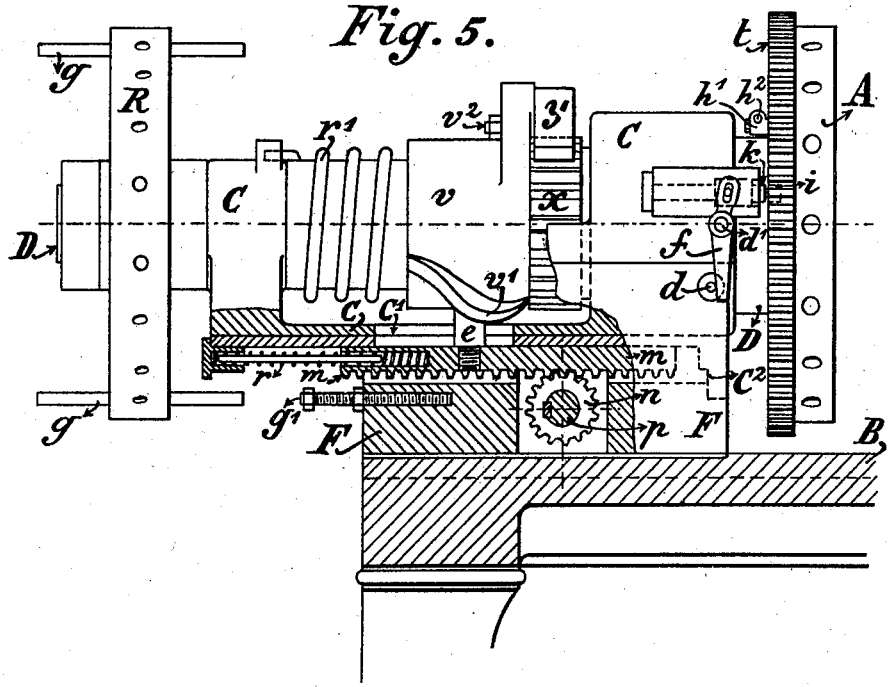
Figure 6:
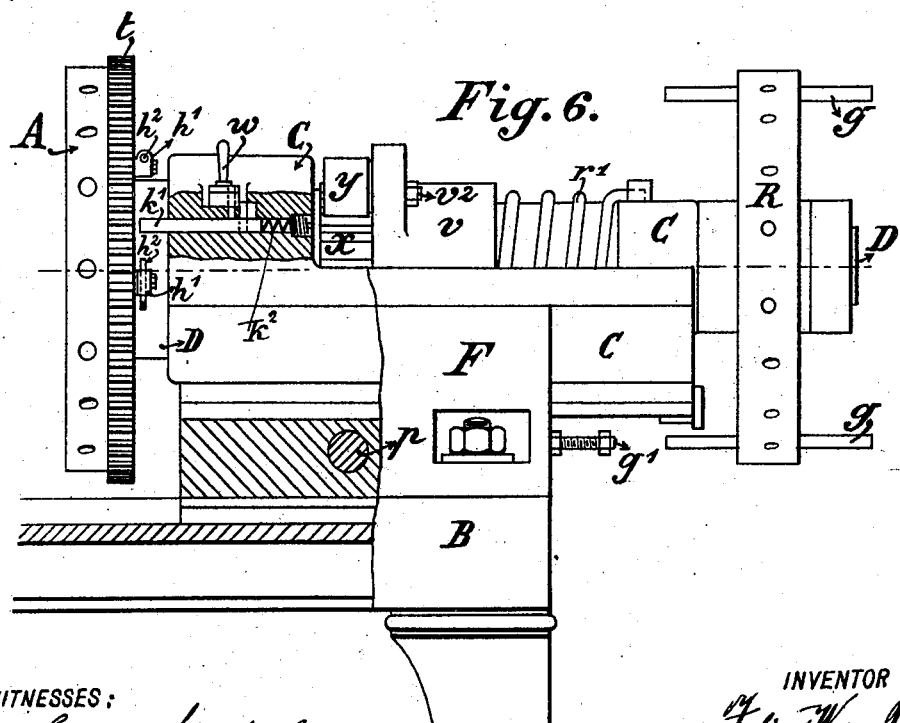

Figure 1 represents a vertical longitudinal section of the turret and supporting parts. Fig. 2 is a plan view of Fig. 1. Fig. 3 is a vertical transverse section on line 3 3, Fig. 1. Fig. 4 is a side elevation of my improved lathe, showing the work held in position in the lathe and one of the tools acting thereon. Fig. 5 is a side elevation of the rear portion of the lathe, said figure being partly in vertical longitudinal section on line 5 5, Fig. 2, and shown in the moment when the shifting of the turret-head takes place. Fig. 6 is a side elevation, partly in section, on line 6 6, Fig. 2, showing the arrangement of the plane contact. Fig. 7 is a vertical longitudinal section of the turret-head arranged for turning irregular forms in longitudinal direction. Fig. 8 is an end elevation, partly in section, on line 8 8, Fig. 7. Fig. 9 is a plan view of the pattern-gage with the contact-screw used for turning an irregular body of the shape shown in Fig. 7. Fig. 10 is a vertical section of the turret-head arranged so as to turn irregular forms in plane direction—that is to say, in a plane parallel with the turret-head. Fig. 11 is an end elevation, partly in section, on line 11 11, Fig. 10. Fig. 12 is a plan view of the pattern-gage with the contact-screw for turning irregular bodies of the shape shown in Fig. 10. Figs. 13 to 17 show the turret arranged with different kinds of tools, Fig. 13 showing the tools for turning exterior screw-threads and finishing them by a separate tool, Fig. 14 showing a tool for cutting interior screw-threads, Fig. 15 showing a shaping and finishing tool, Fig. 16 showing two planing-tools for two separate planes, and Fig. 17 showing planing-tools working in one plane.

Similar letters of reference indicate corresponding parts.

Referring to the drawings, Fig. 4, B' represents the spindle-support which carries the cone-pulley $a$ and the lathe-spindle $b$ and which is rigidly attached to the bed B of the lathe. The disk-shaped tool-head or turret A is applied to a horizontal shaft D, which is supported in suitable bearings on a longitudinally-moving carriage C. The shifting of this carriage is produced by means of a hand-wheel $o$, to the shaft $p$ of which is keyed a pinion $n$, which meshes with a rack $m$. (Shown in Fig. 1, 3, and 5.) The carriage C is guided on an intermediate slide F, which is again guided on suitable ways of the bed-plate B and which serves for the purpose of permitting the use of the lathe for work-pieces of different lengths. When the intermediate slide F is properly adjusted to the work-piece N, it is permanently attached to the bed B. A connection of the working spindle $b$ with the turret-head A for the automatic shifting of the latter in axial direction is not intended in this arrangement, as the turret-head A is intended to be moved by hand in longitudinal direction.

In the carriage C the shaft D is mounted parallel with the lathe-spindle $b$, as shown in Fig. 4. It carries at its front end a turret-head A, which is provided with socket-holes $u$ for the insertion of the tools $z$. To the rear end of the spindle D is applied the contact-head R, which supports several adjustable contact-pins $g$. Between the journal-bearings of the shaft D is keyed the toothed shifting wheel $x$, and a drum $v$, which is capable of axial turning motion on the shaft D, is also arranged between said bearings. The drum $v$ carries a bolt $v^2$, to which the pawl $y$, which engages the shifting wheel $x$, is pivoted.

For producing the shifting of the tools $z$ at the end of each backward motion of turret-head A the drum $v$ is provided with a curved guide portion or cam $v'$, along which the pin $e$, that is attached to the rack $m$, is guided and which moves in the slot $C'$ of the carriage C.

The rack $m$ is acted upon by a strong helical spring $r$ in such a manner that during the return motion of the turret-head A the spring $r$, which is interposed between the rack $m$ and the carriage C, can push back the entire carriage with the turret-head A. A second spring $r'$ is interposed between the drum $v$ and a stop on the bearings of the shaft D and presses the curved guide $v'$ of the drum $v$ toward the pin $e$, so that during the shifting of the rack $m$ and pin $e$ the drum $v$, with its curved guide $v'$, is likewise pressed against the pin $e$ and compelled by the pawl $y$ to turn on the shaft D as the pin $e$ is moved along the guide $v'$. The length of turning motion is proportionate to the number of tools $z$ which are successively to be thrown into action. The turning motion commences when the lug $C^2$ at the front part of the carriage C abuts against the intermediate slide F, in which position the carriage C cannot be moved farther, and when the rack $m$ commences to slide in the carriage C, as shown in Fig. 1, it continues until the pawl $y$, controlled by pin $e$, drops into the next adjacent recess of the toothed wheel $x$, as shown in Fig. 5. When the turret-head A is moved again toward the spindle-stock B', the rack $m$, with its pin $e$, is moved at first without taking the carriage C along, and thereby presses the pin $e$ against the curved guide $v'$ on the drum $v$, whereby the drum $v$ and the pawl $y$ are returned into their former positions, so that the pawl $y$ produces the shifting of the turret-head A. As soon as the front end of the rack $m$ abuts against the lug $C^2$ of the carriage C the rack $m$ moves the carriage C, and thereby the turret A, toward the lathe-spindle $b$. The shifting action of the turret-head can also be accomplished directly by hand by means of the gear $t$ and pinion $s$, which has a hand-wheel, as shown in Figs. 3 and 4.

The turret-head A, the axis of which is, as before mentioned, parallel with the lathe-spindle $b$ and the motion of which takes place parallel to the same, is provided, as shown in the drawings, with sixteen tool-sockets $u$, which are made alternately in two different sizes and in which the tools are supported by means of set-screws H. On the rear surface of the turret-head A is arranged a circular groove $h$ for receiving adjustable stops $h'$, provided with contact-pins $h^2$, which abut against the adjustable index $k$ (shown in Figs. 2 and 6) and which limits the motion of the turret-head in axial direction in plane turning, drilling, and similar work.

The stop-bolt $k'$ in Fig. 14 can be withdrawn by the cam-lever $w$, so that the contact-stop $h'$ during the shifting of the turret-head A is permitted to pass the stop-bolt $k'$.

The position of the tool-socket $u$ concentric with the axis of the lathe-spindle $b$ is secured by the index-bolt $k$, which enters into the index-socket $i$, arranged in the rear surface of the turret-head A, and into which the bolt $k'$ is pressed by a spring $k^2$. The index-bolt $k$ is pushed back during the return motion of the carriage C by the pin $d$ on the intermediate slide F and lever $f$, which is pivoted to the carriage C at $d'$, as shown in Figs. 2, 3, and 5. The lever $f$ receives its motion by contact with the pin $d$. Fig. 5 shows the position of the index-bolt $k$ when the same is withdrawn from the index-socket $i$.

The contact-head R at the rear end of the shaft D carries the contact-pins $g$, which abut against the adjustable contact-pin $g$ on the intermediate slide F. The number of contact-pins $g$ is equal to the number of tools in the turret-head A, so that each tool which is mounted in the turret-head A has a contact-pin $g$ for limiting the motion of the carriage in longitudinal direction toward the lathe-spindle $b$.

My improved lathe is operated in the following manner: The work-piece N is held by a chuck M on the lathe-spindle $b$ while the required tools $z$ are inserted in their successive order into the turret-head A. The first tool $z$ is now moved forward in the required position and the corresponding contact-pin $g$ adjusted. (See Fig. 4.) The carriage C is now moved back by means of the hand-wheel $o$, pinion $n$, and rack $m$ until the lever $f$, which is connected with the index-bolt $k$, abuts against the pin $d$ on the intermediate piece F, so that the index-bolt is withdrawn from the index-socket $i$ of the turret-head A. The carriage C then abuts with its lug $C^2$ against the stationary intermediate piece F, so that the carriage cannot be moved farther in backward direction. The spring $r$, which is interposed between the rack $m$ and carriage C, is now set to tension for the reason that the motion of the rack $m$ is continued, though the carriage C is not moved farther back. Likewise as the rack $m$ continues its motion on the carriage C the pin $e$ is moved in the slot $C'$, and the curved guide $v'$ on the drum $v$ is pressed against the pin $e$ under the action of torsion-spring $r'$, so that the drum $v$ is compelled by the pawl $y$ to be turned sufficiently so that the pawl can be dropped into the next recess of the ratchet-wheel $x$. When the hand-wheel $o$ is turned in the opposite direction, so that the ratchet-wheel is returned into the initial position, the pin $e$ is pressed against the curved guide $v'$ of the drum $v$, so that they are both turned together with the shaft D, the turret-head A, and contact-head R for such a distance as that to which the pawl $y$ has been moved toward the ratchet-wheel $x$—that is to say, for the required number of teeth—so that an extra tool $z$ is placed in line with the work. As soon as the rack $m$ strikes the lug $C^2$ of the carriage C the latter is moved forward, so that the lever $f$ is released and the index-bolt $k$ pressed by the spring into the socket $i$ of the turret-head A, whereby the latter is locked into position.

If plane-turning or any operation is to be performed in which the turning of the turret-head A by the gear $s\,t$ is necessary, the corresponding index-socket $i$ is closed by means of a plug, so that the index-bolt $k$ cannot enter into the said socket $i$. In a similar manner some of the spaces between the teeth of the ratchet-wheel $x$ are covered up when it is not desired that the pawl $y$ should drop into the same and when several tools $z$ are to be skipped. By this arrangement of the lathe the result is obtained that with the motion of the tool $z$ the work N is cleared and simultaneously an automatic shifting obtained, whereby one or more tools Z can be called into action.

The rotary motion imparted to the turret-head A can be utilized for plane-turning, as shown in Figs. 4, 16, and 17; shaping in the longitudinal direction inside and outside, as shown in Figs. 7 and 8; shaping in the plane direction, according to a suitable pattern-gage E, as shown in Figs. 10 and 11; turning of interior and exterior screw-threads, as shown in Figs. 13 and 14, and for drilling and conically turning.

When the turret-head A is moved in longitudinal direction—that is to say, toward the spindle-stock B'—and when simultaneously a regular or irregular axial motion is imparted along a pattern-guide E, the conical turning or shaping is obtained, as shown in Figs. 7 and 9. When the turret-head A is turned and simultaneously the carriage C, with the turret-head, moved longitudinally along a pattern E, ordinary shaping, Figs. 10 and 12, is obtained.

By combining several tools $z$ several turnings in longitudinal direction, as well as in the plane direction, can be made in one operation, Figs. 16 and 17.

In the following the different work which the machine is capable of doing and which is shown in Figs. 7 to 17 is more fully described.

Figs. 7 to 9 show planing in longitudinal direction—i. e., in the direction parallel with the lathe-spindle $b$ and to the axis of the turret-head. In this case the holder L for the guide-screw L' is screwed to the turret-head A. The guide-screw L' moves along on an irregular pattern-plate E, so that the turret-head A is compelled to follow the irregular motion imparted thereto. In the turret-head A are arranged two steel planing-tools $z\,z'$ for turning off the exterior and interior of the hollow body N of irregular form, as shown in Fig. 9. During the motion of the carriage C with the turret-head A in longitudinal direction the turret-head, by the action of the pattern E and guide-screw L', receives simultaneously a lateral oscillating movement, which is transmitted to the tools $z\,z'$, so that they impart to the body N the shape of the pattern-gage E. According as the guide-screw L' is moved along the pattern E or the pattern E' (shown in Fig. 8) the turning action is produced at the inner or outer surface of the work.

Figs. 10 to 12 show the planing action in the direction of a plane parallel with the plane of the turret-head A, as indicated by the arrow in Fig. 11. The guide-screw L', which is attached to the turret-head A, moves while the head A is rotated along a guide-pattern E, whereby the turret-head follows the irregular motion of the guide-screw L' and transmits the same to the tool $z$.

Fig. 13 shows the arrangement for cutting screw-threads on the exterior surface of the work N. In this case the work N is inserted into the chuck M, which is screwed on the lathe-spindle $b$. (See also Fig. 4.) The thread is first cut in the rough by the die $z$, after which the turret-head A is turned by the gear $s\,t$ in the direction of the arrow, so that the finishing-tool $z'$ can complete the thread.

Fig. 14 shows the corresponding arrangement for cutting interior screw-threads.

Fig. 15 shows the arrangement for shaping the exterior circumference of the work N. The turret-head A is first turned in the direction of the arrow until the previously-adjusted contact-pin $h'$ abuts against the bolt $k'$, (see also Fig. 6,) whereby the motion of the turret-head A is limited. The turret-head A is then turned in opposite direction until the upper contact-stop $h'$ abuts against the contact $k'$, so that the knurling-wheel $z'$ can finish the rim before shaped by the tool $z$.

Fig. 16 shows the arrangement for plane-turning with several plane-turning tools $z\,z'$. The tools $z\,z'$ are so fastened to the turret-head A that when the tool $z$ attacks the exterior circumference of the work N the tool $z'$ attacks the outer circumference of the rim, so that when the turret-head A is turned in the direction of the arrow both planes are completed by one operation of the machine.

Fig. 17 shows the arrangement for plane turning of a surface by means of two tools. The tools $z\,z'$ are so attached to the turret-head A that one tool $z$ commences the turning action on the outer circumference of the work N and the other tool $z'$ attacks the inner circumference of the work, so that the surface can be finished entirely, when by the turning of the turret-head A in the direction of the arrow the tools $z\,z'$ have passed through half of the width of the surface, whereby each tool operates only on one-half of the entire plane surface. As soon as this is accomplished the turret-head A is turned in the other direction, so that the finishing-tool $z^2$ is set to the work, which then passes over the entire surface.

Having thus described my invention, I claim—

1. In a turret-lathe, the combination of the lathe-spindle, a longitudinally-movable carriage provided with bearings parallel with the lathe-spindle, a rotary, peripherally-toothed, disk-shaped tool-head mounted on said shaft and having facial tool-sockets parallel with the lathe-spindle and said shaft, a pinion meshing with the peripheral teeth of the tool-head, and means for turning said pinion so as to drive the tool-head in either direction and permit plane-turning or shaping without a slide-rest, substantially as set forth.

2. In a turret-lathe, the combination of the lathe-spindle, a rotary tool-head provided with tool-sockets on the face which is at right angles to the lathe-spindle, the axis of which head is parallel with the axis of the lathe-spindle, means for rotating said head, index-sockets on the rear face of the tool-head, an index for said index-sockets, a pivoted lever, and a pin against which said lever abuts for automically releasing the index from the socket in which it is engaged when the tool-head is moved back from the lathe-spindle, substantially as set forth.

3. In a turret-lathe, the combination with the rotary tool-head, having an annular guideway on its rear face, and a stop $h'$ adjustable in said guideway, of a slide adapted to be moved into the circular path through which said stop travels, substantially as set forth.

4. In a turret-lathe, the combination with a rotary tool-head, and a toothed clutch-wheel arranged on the axis of the tool-head, of a rotary spring-actuated sleeve mounted to turn on the axis of said tool-head, means for automatically turning said sleeve, and a pawl pivoted to said sleeve and adapted to engage the teeth of said clutch-wheel, substantially as set forth.

5. In a turret-lathe, the combination of a rotary tool-head, the axis of which is parallel with the axis of the lathe-spindle, means for reciprocating the tool-head, a contact-disk carrying contact-pins and supported on the axis of the tool-head, and means for turning the tool-head in one or the opposite direction, whereby the different operations can be executed, such as plane-turning, shaping, and thread-cutting, substantially as set forth.

In testimony whereof I have signed my name to this specification in the presence of two subscribing witnesses.

JULIUS WILHELM VON PITTLER.

Witnesses:
RUDOLPH FRICKE,
ANDREW REINER.